United States Patent

[11] 3,625,764

| [72] | Inventor | Mario DeRossi<br>Rome, Italy |
|---|---|---|
| [21] | Appl. No. | 856,408 |
| [22] | Filed | Sept. 9, 1969 |
| [45] | Patented | Dec. 7, 1971 |
| [73] | Assignee | Consiglio Nazionale Delle Ricerche<br>Rome, Italy |
| [32] | Priority | Apr. 23, 1969 |
| [33] | | Italy |
| [31] | | 36614 A/69 |

[54] ELECTRODE FOR ELECTRIC STORAGE BATTERIES CONTAINING ZINC HALIDE IN AQUEOUS SOLUTION, OF THE TYPE HAVING A SOLUBLE CATHODE AND A DISSOLVED ANODE
1 Claim, 8 Drawing Figs.

[52] U.S. Cl............................................... 136/22,
136/124
[51] Int. Cl................................................... H01m 35/02

[50] Field of Search.................................... 136/22,
121, 120, 153, 155; 252/510

[56] References Cited
UNITED STATES PATENTS

| 1,060,468 | 4/1913 | Little............................ | 136/121 |
| 2,566,114 | 8/1951 | Bloch........................... | 136/155 |
| 3,328,202 | 6/1967 | Riffe............................ | 136/22 |
| 3,476,605 | 11/1969 | Owens.......................... | 136/153 |
| 3,476,606 | 11/1969 | Owens.......................... | 136/153 |

*Primary Examiner*—Winston A. Douglas
*Assistant Examiner*—C. F. Lefevour
*Attorney*—Kimmell, Crowell & Weaver ABSTRACT: An electrode for use in zinc halide-halogen cells comprising a graphite mass in electrical contact with a dispersion of powdered graphite and a perchlorate salt of tetramethyl- or tetrabutylammonium is disclosed along with various cell constructions.

INVENTOR

MARIO DeROSSI

BY Kemrad, Crowell & Weaver

ATTORNEY

INVENTOR
MARIO DeROSSI

BY Kimrad, Crowell & Weaver
ATTORNEY

INVENTOR
MARIO DeROSSI

BY Kimmel, Crowell & Weaver

ATTORNEY

ELECTRODE FOR ELECTRIC STORAGE BATTERIES CONTAINING ZINC HALIDE IN AQUEOUS SOLUTION, OF THE TYPE HAVING A SOLUBLE CATHODE AND A DISSOLVED ANODE

BACKGROUND OF THE INVENTION

1. Field of the Invention

The present invention concerns an electrode for electric storage batteries containing zinc halide in aqueous solution, of the type having a soluble cathode and a dissolved anode.

2. Description of the Prior Art

Electric storage batteries have been proposed which have high specific energy and power, a coefficient of utilization of active anodic and cathodic substances nearing unity, and made up of a number of cells. Each cell contains a metallic cathode, an aqueous electrolyte of a salt of a cathodic metal with which the cathode reacts to form a soluble salt, and an anode dissolved in the electrolyte and formed by the mass of the metallic cathode.

The use of zinc as the metal for the cathode, and a halogen, preferably bromine or iodine, as the dissolved anode, the electrolytic salt then being composed of a zinc halide, has been proposed.

Such batteries have a high specific energy (in relation to the active mass). In the case of the zinc-bromine pair, the electromotive force is about 1.82 volts and the theoretical specific energy is around 360 Wh/kg.

Such electric storage batteries have certain disadvantages however. For example, the aqueous solution, containing a high percentage of halogen, attacks the zinc chemically at the end of the charging process and when the circuit is open.

This disadvantage may be abdicated by preventing the electrolytic solution from entering into contact with the zinc when the latter is not required to furnish an electric charge. In addition, it has been proposed to introduce, in the recycling circuit of the electrolyte, an organic solvent which is not soluble in water and which is capable of retaining the halogen which has been liberated during the charging process. The halogen can then be returned to the electrolyte, by various means, during the discharging process. Such solutions to the problem have not always proved efficient and require an increase in the mass of material not necessary to the electrochemical reaction. Auxiliary devices whose weight causes a diminution of the value of the specific energy obtainable are also required. For example, in the case of the zinc-bromine pair, the theoretical specific energy drops from 360 Wh/kg. to a real value of less than 100 Wh/kg.

SUMMARY OF THE INVENTION

The problem of eliminating the halogen during the charging process and of restoring it in an elementary form during the discharging process is solved by the present invention. According to this invention the positive electrode of each cell is made of a conducting mass which is laterally in contact with the electrolyte and closely linked with a dispersion of alkylammonium perchlorates.

Also according to the present invention, the dispersion can contain the perchlorate of a tetralkylammonium, which is preferably tetramethylammonium or tetrabutylammonium, as the salt of alkylammonium.

Among the above-mentioned salts, some are particularly efficient, such as the salts of tetramethylammonium, TMA, which have the notable property of combining with halogen in high proportions. In the case of bromine, the ratio is one molecule of TMA to 9 molecules of bromine.

Also according to the present invention, the powder of an inert substance, although not theoretically necessary, can be added. Elementary halogen is nonconducting, and, when absorbed by a salt of tetralkylammonium, forms a poor conducting layer on the surface of the electrode. This reduces the efficiency of the charging process. A similar phenomenon occurs with lead batteries.

Other objects will appear from the explanation which follows and by means of practical examples offered as exemplifications and not as limitations, and from the drawings to which reference is made.

Figure 1:
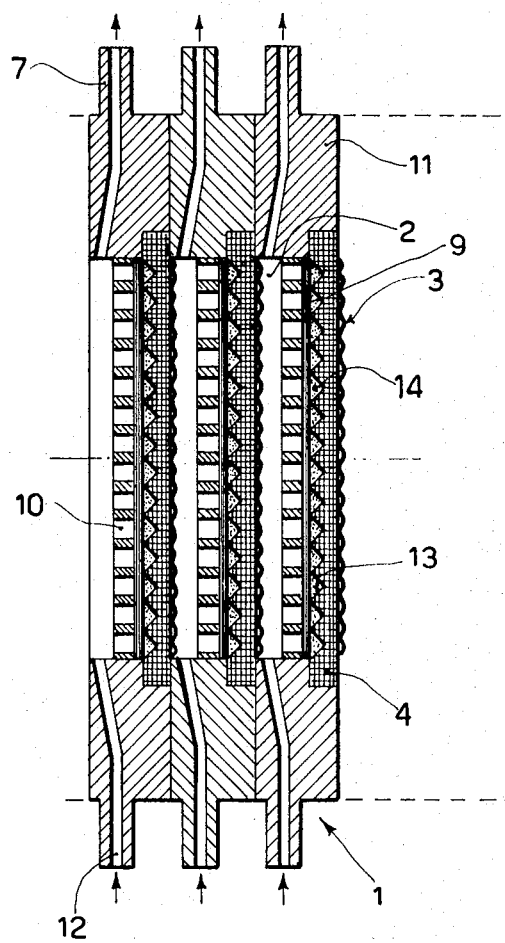
FIG. 1 represents in section a series of flat cells according to the invention.
Figure 2:
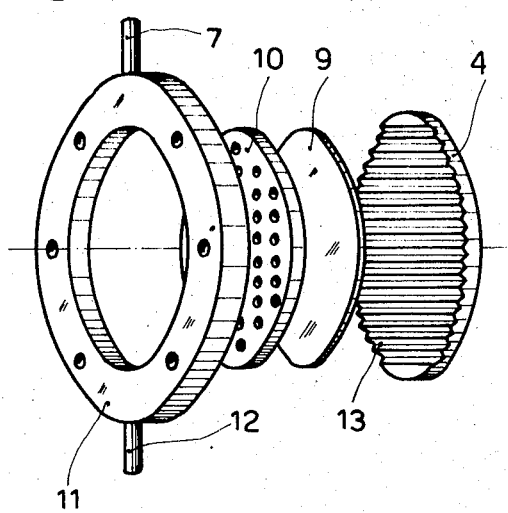
FIG. 2 represents an exploded axial view of one of the cells shown in FIG. 1.
Figure 7:
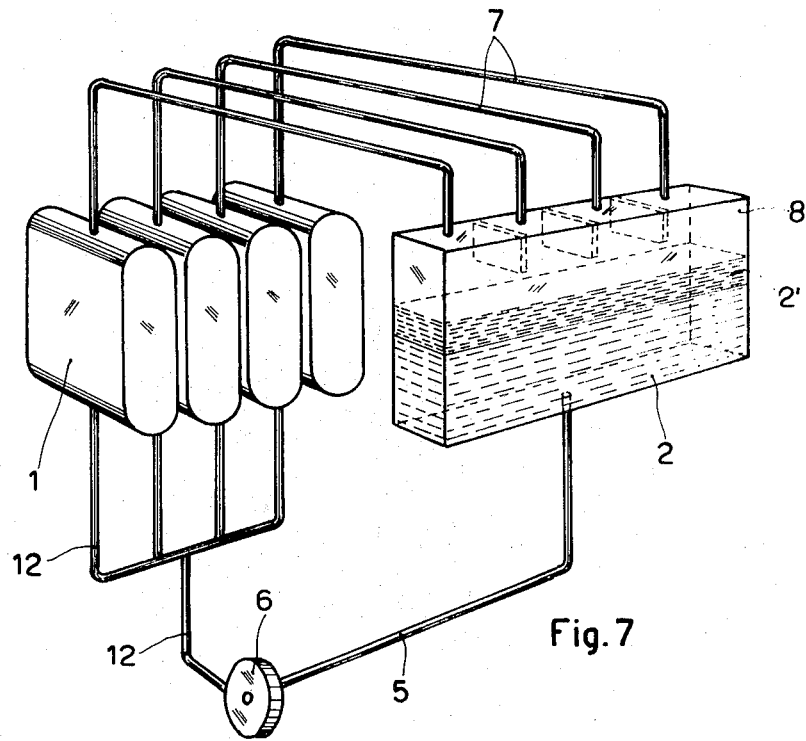
FIG. 7 represents an axial view of a series of capsule cells inserted in an installation for recycling the electrolyte.

As can be seen in FIGS. 1, 2, and 7, the battery fitted with electrodes according to the present invention, in the case of flat cells, is made up of a series of reaction cells 1, in each of which there is a zinc cathode 3, forming the negative pole, and a neutral graphite cathode 4, forming the positive pole, closely linked to the cathode 3 of the adjacent cells. In the example shown in FIGS. 1 and 2, the cathode-electrode complex is in the shape of a circular disc, and is held in place inside the washers 11, which are nonconducting and preferably made out of a plastic material, in a circular shape and with a projecting rim to fit round the electrodes 4.

In the washers 11 are conduits 7 and 12, for, respectively, the charge and discharge of the electrolyte 2, which is contained in a reservoir 8, shown in FIG. 7, which may be covered with an insulating layer 2', made of an organic solvent, when the battery is not required to furnish electric current.

A series of tubes 5 carry the electrolyte 2 from the reservoir 8 to the pump 6, which distributes the electrolyte through the conduit 12 to the simple cell 1, while the battery is working.

According to the present invention, the positive neutral electrodes comprise a conducting mass 4, preferably made out of graphite, which is unilaterally in contact with the electrolyte 2; this conducting mass 4 has grooves 13 in it, which, apart from increasing the effective area of the electrode, contain a certain quantity of dispersion of alkylammonium salt, preferably tetramethylammonium, (TMA), to which is added the conducting powder 14, preferably powdered graphite.

The powdered graphite, as well as the TMA, are pressed against the grooves by a porous membrane 9, which in turn is held in place by a diaphragm 10, preferably made out of perforated plastic.

An exemplary zinc-bromine battery would work as follows:

During the charging process, while the $Zn^{++}$ is being deposited on the cathode, the electrolytic solution containing the $Br^-$ ions comes into contact with the area of the positive electrode, where, discharging the ions, it becomes elementary $Br_2$, which combines immediately with the TMA salt adhering to the plate. The electrolyte gradually weakens to become dilute $ZnBr_2$ solution until finally it becomes $H_2O$ and supporting conducting ions which take no part in the electrochemical reaction.

During the discharge process, the $Zn$ dissolves and forms, with the $Br_2$, $ZnBr_2$ which, deposited on the surface of the positive electrode, is soluble in the electrolyte.

As will be seen, this process avoids having $Br_2$ circulating in the whole of the cathode area where it could cause corrosion. On the other hand, the process presents the following advantage: the restoration of the bromine during the discharging process is characterized by its extreme rapidity.

The battery represented in FIGS. 1 and 2 has a low internal resistance and can be used to produce a high current.

Figure 3:
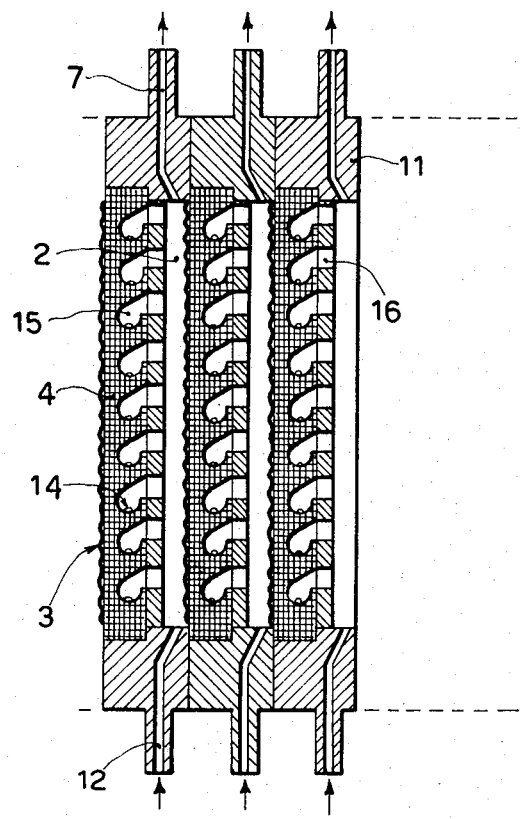
FIG. 3 represents in section a series of flat cells in another form.
Figure 4:
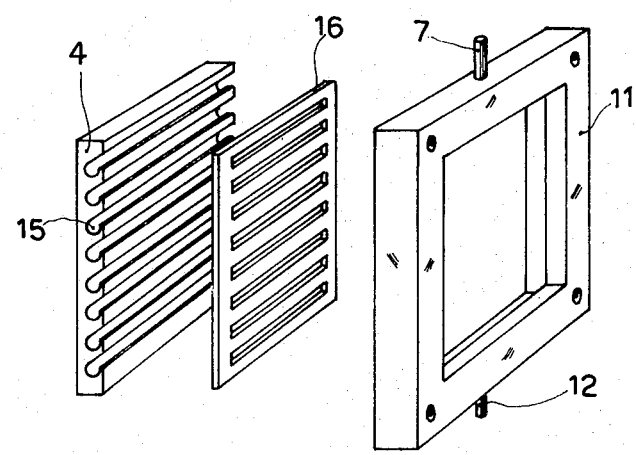
FIG. 4 represents an exploded axial view of the cells shown in FIG. 3.

The neutral positive electrodes shown in the variant design in FIGS. 3 and 4 are constructed of a conducting body 4, preferably made out of graphite, the side of which is in contact with the electrolyte 2 through the open channels on the surface of the electrodes, and on the bottom of which is deposited a dispersion 14 of an alkylammonium salt, preferably TMA, in such quantities that it does not completely fill the channels 15. An insulating screen 16, made preferably out of a plastic material, protects the effective surface of the positive electrode 4.

The working of this variant design shown in FIGS. 3 and 4 is similar to that shown in FIGS. 1 and 2, the only difference being that the TMA paste can be increased to a point where it absorbs more halogen, thus rendering possible the storage of a larger capacity as well as a slightly increased internal resistance.

Figure 5:
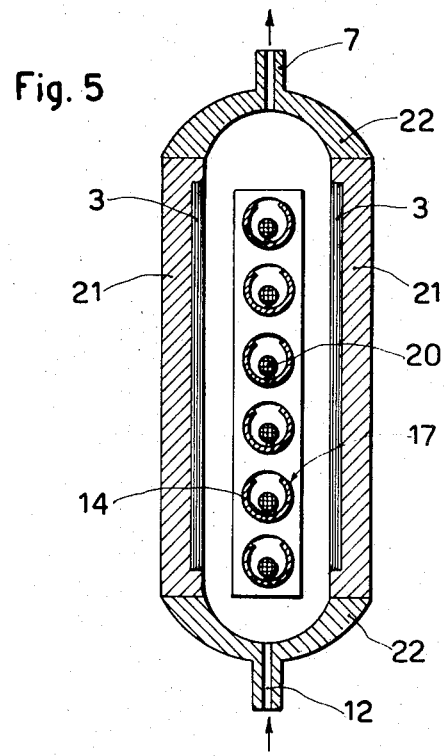
FIG. 5 represents in traverse section a capsule cell.
Figure 6:
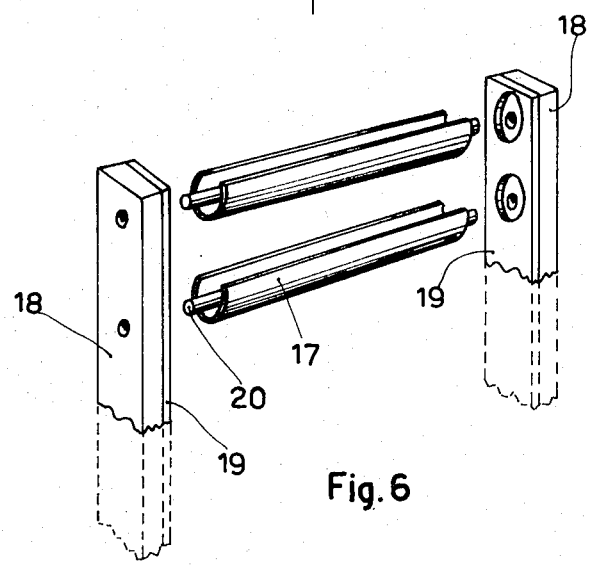
FIG. 6 represents an exploded axial view of part of the cell shown in FIG. 5.

Also according to the present invention and with reference to FIGS. 5, 6, and 7, the cells can be of a capsule type. Such cells are constructed of a number of cradles 17, made of an inert, nonconducting material, placed one under the other, and supported at the sides by two mounts 18, of some conducting material, for example, graphite, covered on the inner side (that is, the side towards the cells) by an insulating layer 19. Inside the cradles 17, there lie the conducting rods 20, which constitute the inert positive electrodes. The conducting rods are of graphite, with perhaps an inner metal core, and they are all both electrically and mechanically connected to the sections 18 of the mounts. A dispersion of alkylammonium salts, preferably TMA, is freely disposed on the inside of all the cradles 17, in such quantities that it fills only the bottom of each cradle 17. The two lateral walls 21 of the capsule serve as supports for the zinc cathodes 3, which are therefore doubled and placed facing each other. The top and bottom elements 22 seal each cell hermetically. A recharging conduit 12 for the electrolyte passes through the bottom element 22, and a discharge conduit 7 passes through the top element 22.

By means of capsule cells, a better disposition of volume can be obtained for the combination of halogens with the dispersion of alkylammonium, which permits the construction of high capacity batteries. The large surface area of the cathode 3 permits a reduction in the thickness of the $Zn^{++}$ deposit, and the deposit is laid more securely, without the formation of leafing, which can slough off.

Figure 8:
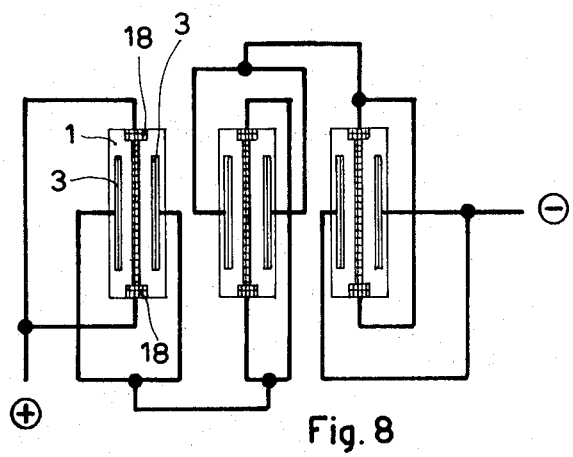
FIG. 8 represents the electrical circuit linking a series of cells of the capsule type.

It is clear that in order to build a battery with the capsule cells placed in series, the cells have to be connected electrically either to the two cathodes 3 or to the two sections 18 of the mounts, the cathodes 3 of a cell being then connected to the sections 18 of the adjacent cell, and so on, as shown in FIG. 8. Such an electrical circuit can also be used in the case of flat cells when there is no electrical continuity between adjacent cells.

This invention has been illustrated and described in several versions, but other variant versions can be made without departing from the invention as defined in the following claims.

What is claimed is:

1. An electrode for use in a cell of the type which includes a zinc cathode and a zinc-bromide electrolyte, said electrode comprising a conductive graphite mass having open channels containing, and in intimate contact with, a conductive dispersion of powdered graphite containing an alkylammonium perchlorate selected from the group consisting of tetramethylammonium perchlorate and tetrabutylammonium perchlorate, and an insulating screen positional to prevent dislocation of said dispersion.

* * * * *